(12) United States Patent
Farison et al.

(10) Patent No.: US 10,540,663 B2
(45) Date of Patent: *Jan. 21, 2020

(54) MECHANISM FOR VERIFYING THE AUTHENTICITY OF A PRODUCT

(71) Applicant: STMicroelectronics (Rousset) SAS, Rousset (FR)

(72) Inventors: Denis Farison, Le Tholonet (FR); Fabrice Romain, Rians (FR); Christophe Laurencin, Peypin (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 80 days.

This patent is subject to a terminal disclaimer.

(21) Appl. No.: 15/900,362

(22) Filed: Feb. 20, 2018

(65) Prior Publication Data

US 2018/0174156 A1 Jun. 21, 2018

Related U.S. Application Data

(63) Continuation of application No. 14/305,070, filed on Jun. 16, 2014, now Pat. No. 9,934,508.

(30) Foreign Application Priority Data

Jun. 18, 2013 (FR) ...................... 13 55727

(51) Int. Cl.
  *G06F 21/00* (2013.01)
  *G06Q 30/00* (2012.01)
  *G06F 21/44* (2013.01)
(52) U.S. Cl.
  CPC .......... *G06Q 30/018* (2013.01); *G06F 21/44* (2013.01)

(58) Field of Classification Search
  CPC .... G06F 3/1203; G06F 3/1229; G06F 3/1238; G06F 3/1285; G06F 21/44; G06F 21/608; G06F 21/73
  See application file for complete search history.

(56) References Cited

U.S. PATENT DOCUMENTS 8,386,781 B2 2/2013 Cho et al.
10,157,386 B2 * 12/2018 Farison ................ G06Q 30/018
(Continued)

FOREIGN PATENT DOCUMENTS

WO  WO-2014079471 A1 *  5/2014  .......... H04L 65/4084

OTHER PUBLICATIONS

INPI Search Report and Written Opinion for FR 1355727 dated Oct. 31, 2013 (7 pages).

*Primary Examiner* — Sarah Su
(74) *Attorney, Agent, or Firm* — Crowe & Dunlevy

(57) ABSTRACT

The authenticity of a product associated with a host device is verified through a process. The product contains, in segments of a non-volatile memory, several different functions stored in ciphered fashion. The process involves, in a first phase, the sending by the host device of a control signal for executing a function, with the product functioning to decipher the function and store the unciphered function in the non-volatile memory. The process further involves, in a second phase, the sending by the host device of a control signal for causing execution of the deciphered function, with the product functioning to execute the function and send a result of this execution back to the host device. The host device evaluates the received result to verify product authenticity.

19 Claims, 2 Drawing Sheets

```
HOST                                        PRODUCT
           ACT SEGi
    ─────────────────────────▶             DECIPHER
            (KEYi)                          CSEGi

STORE
                                          UNCIPHERED
            RESULT                         OPCODES
    ◀─────────────────────────
OK/NOK
                                           EXEC FCTi
```

(56) References Cited

U.S. PATENT DOCUMENTS

| | | | |
|---|---|---|---|
| 2007/0079125 A1* | 4/2007 | Adkins | G06F 21/33 |
| | | | 713/176 |
| 2008/0094220 A1 | 4/2008 | Foley et al. | |
| 2011/0138192 A1* | 6/2011 | Kocher | G06F 21/602 |
| | | | 713/189 |
| 2011/0246756 A1* | 10/2011 | Smith | H04L 9/3252 |
| | | | 713/2 |
| 2014/0006738 A1* | 1/2014 | Nagai | G06F 21/44 |
| | | | 711/163 |
| 2014/0198687 A1* | 7/2014 | Raleigh | G06Q 20/20 |
| | | | 370/259 |
| 2014/0310800 A1* | 10/2014 | Kabra | G06F 21/44 |
| | | | 726/17 |
| 2014/0367465 A1 | 12/2014 | Farison et al. | |
| 2016/0094533 A1 | 3/2016 | Bucci et al. | |
| 2017/0004333 A1* | 1/2017 | Modave | G06F 21/73 |
| 2019/0080336 A1* | 3/2019 | Farison | G06Q 30/018 |

* cited by examiner

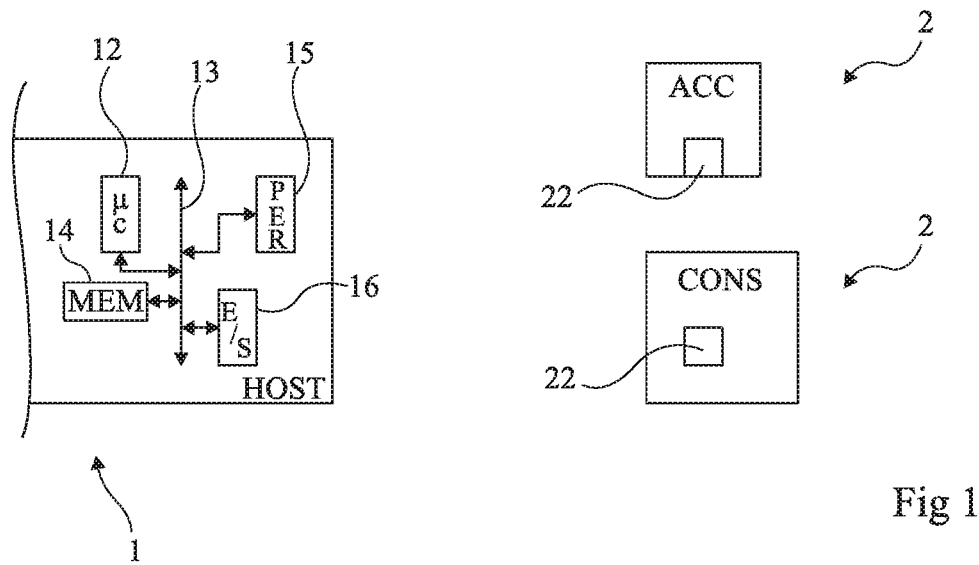
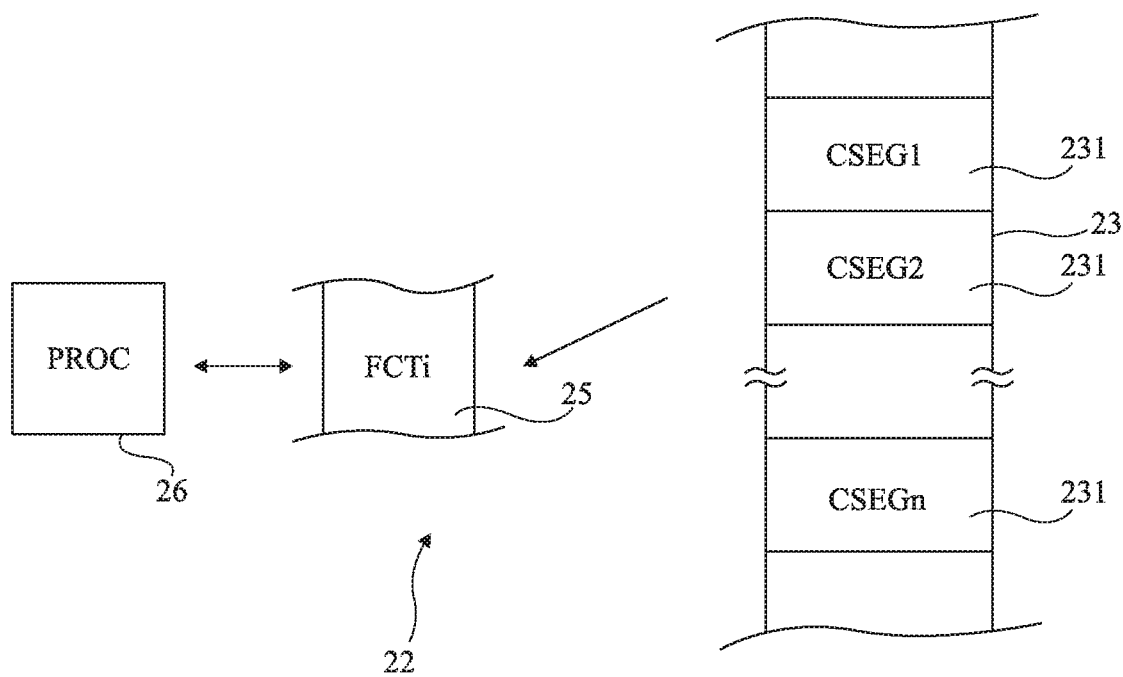
Fig 1
Fig 2

MECHANISM FOR VERIFYING THE AUTHENTICITY OF A PRODUCT

CROSS REFERENCE TO RELATED APPLICATIONS

This application is a continuation of U.S. patent application Ser. No. 14/305,070 filed Jun. 16, 2014, which claims the priority benefit of French Patent Application number 1355727, filed on Jun. 18, 2013, the disclosures of which are hereby incorporated by reference.

TECHNICAL FIELD

The present disclosure generally relates to electronic circuits and, more specifically, to a method for verifying the authenticity or the origin of a product (an accessory or a consumable) intended to cooperate with a device.

BACKGROUND

In many fields, it is desired to guarantee that a product, for example, an ink cartridge, a battery, an accessory, etc., to be used in a device, is an original or authentic product, that is, a product approved by the device manufacturer. To achieve this, an authentication key is generally stored in an electronic circuit associated with this product and is used, when the product is installed in the device or when it should cooperate therewith, to verify that the product is authentic.

However, if the secret can be discovered and a manufacturer commercializes products which are not approved by the device manufacturer, but are however equipped with circuits having the right key, the devices will consider these products as authentic.

SUMMARY

An embodiment of the present disclosure relates to a technique for verifying the authenticity of a product, which overcomes all or part of the disadvantages of existing solutions.

Another embodiment of the present disclosure enables to block the use of batches of non-authentic products without for all this preventing the use of authentic products of same generation.

An embodiment provides a method for verifying the authenticity of a product associated with a host device, wherein the product contains, in segments of a non-volatile memory, several different functions stored in ciphered fashion, wherein: in a first phase: the host device sends a control signal for executing a function; the product deciphers the function and stores it unciphered in the non-volatile memory; and in a second phase: the host device sends a control signal for executing the deciphered function; the product executes the function and sends a result of this execution to the host device.

According to an embodiment, a key for deciphering the segment containing the function is contained in the activation control signal sent by the host device.

According to an embodiment, the host device verifies the result to authenticate the product.

According to an embodiment, the first phase is only implemented once per product.

According to an embodiment, the second phase is implemented on each use of the product by the device.

According to an embodiment, the host device contains one function identifier only.

According to an embodiment, said segments are stored on manufacturing of the product.

According to an embodiment, different versions of devices activate different functions of a same type of products.

According to an embodiment, a system comprising at least one host device and at least one product associated with this host device is also provided.

According to an embodiment, the devices are printers and the products are ink cartridges.

In an embodiment, a method comprises: storing, at a plurality of memory segment locations in a product that must be authenticated for use by a host device, said host device being implementable in a plurality of device versions, a corresponding plurality of enciphered executable functions; receiving from the host device a first signal which includes an identifier that identifies a selected segment location of the plurality of memory segment locations, wherein the identifier of the selected segment location is assigned to a particular device version of the plurality of device versions of the host device; accessing the selected segment location to retrieve the particular enciphered executable function of the corresponding plurality of enciphered executable functions that is stored at the selected segment location; deciphering the particular enciphered executable function; storing the particular deciphered executable function; receiving from the host device a second signal requesting product execution of the particular deciphered executable function; executing by the product of the particular deciphered executable function to generate a result; and returning the result to the host device as proof that the product is authenticated for use with the particular device version of the host device.

BRIEF DESCRIPTION OF THE DRAWINGS

The foregoing and other features and advantages will be discussed in detail in the following non-limiting description of specific embodiments in connection with the accompanying drawings, wherein:

FIG. 1 very schematically shows in the form of blocks an example of a system of the type to which the present disclosure applies as an example;

FIG. 2 illustrates an example of storage on the side of the product to be authenticated;

DETAILED DESCRIPTION

Figure 3:
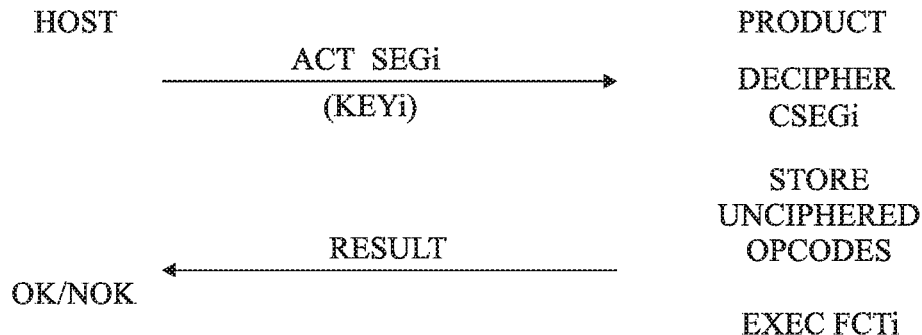
FIG. 3 very schematically illustrates an embodiment of the method of authentication of a product by a device.

The same elements have been designated with the same reference numerals in the different drawings. For clarity, only those steps and elements which are useful to the understanding of the embodiments which will be described have been shown and will be detailed. In particular, the cryptographic ciphering and deciphering processes capable of being used in data exchanges between a device and its accessories or consumables have not been detailed, the described embodiments being compatible with usual processes.

FIG. 1 very schematically shows, in the form of blocks, an example of a system of the type to which the embodiments which will be described apply.

A host device 1 is capable of receiving or of operating with one or several products 2, accessories (ACC), or consumables (CONS).

As a specific example of application, the host device is a printer and the product (consumable) is an ink cartridge. According to another example, it is an electronic system (for example, a game console, a cell phone, etc.) using accessories (for example, game pads, earphones, a hull, a case, etc.). More generally, it may be any type of system based on the cooperation between a main device and one or several accessories or consumables.

Although reference will be made hereafter to the example of a printer and of its ink cartridges, all that will be described transposes, unless otherwise mentioned, to the other systems.

Printer manufacturers are generally looking for a protection against the use of counterfeit or non-authentic cartridges in order, among other things, to guarantee the quality and the reliability of the original cartridges with respect to copies or "clones" for their users. Another object is to avoid possible counterfeits. Reference will be made hereafter to copies to designate non-authentic products, be they slavish imitations or more generally similar products capable of being used to replace authentic products.

The protection generally comprises a mechanism of authentication of a new cartridge introduced into the printer, or even an authentication on each powering-on of the printer, on each leaving of the stand-by mode, or on each printing (on each use of the product). The printer and each cartridge are equipped with an electronic circuit adapted to such an authentication, for example, a cryptographic processor or a program executed by a generic processor. Keys are present on the printer side and on the cartridge side.

For example, as illustrated in FIG. 1, printer 1 comprises a microcontroller-type circuit 12 (µC) capable of communicating over one or several address, control, and data buses 13, with one or several memories 14, one or several peripherals 15 (PER), for example, the various circuits of the printer, and one or several input-output circuits 16 (E/S), among which a device capable of communicating with cartridges 2.

An ink cartridge 2 comprises at least one secure circuit 22 for example, of microcontroller type, comprising the same type of components (not shown): a processor, volatile and non-volatile memories, an input-output interface towards a bus of communication with the printer, etc.

Generally, at the manufacturing, an authentication key formed of a data word is stored in a secure memory of circuit 22. When the cartridge is paired up with the printer, the latter starts an authentication procedure based on this key. To be recognized, all cartridges compatible with a given printer should have a key enabling to authenticate itself with this printer, possible originating from a key derivation mechanism.

Such a mechanism becomes inefficient if the key of a series of cartridges is discovered. In such a case, copies are capable of being manufactured with an authentication method using the right key and the printer will be unable to discriminate them from the original cartridges.

A current solution for printer manufacturers is to change the printer model to change the cartridge type. Indeed, it cannot be envisaged to program a new key in a new batch of printers and to change the cartridge key, since printers already in circulation could then no longer operate with the new cartridges.

Actually, it becomes impossible to revoke a key shared between a printer and a cartridge type, the only solution being to forbid printers already in circulation to use the new cartridges. This would then force these printers to only use copies, which is precisely what is desired to be avoided.

According to the present disclosure, it is provided to store in ciphered fashion, in a memory of the circuit associated with the cartridges, several segments of one or several instructions capable of being used by a processor of the cartridge, each segment being ciphered with a different key. The stored instructions are selected to execute a different function from one segment or sub-program to another. Further, the storage is made in the form of opcodes and of operands directly interpretable by the cartridge processor. The keys for encrypting the segments are unknown by the cartridge. They are not stored therein.

FIG. 2 illustrates an embodiment of such a method. A memory 23 of secure circuit 22 of a cartridge comprises several instruction segments 231 (CSEG1, CSEG2, . . . , CSEGn). Each segment contains at least one opcode and, possibly, all or part of the arguments (operands) of the function to be executed. Each segment may contain several opcodes according to the function that it represents. Certain opcodes may be present in different segments (for example, data reading), provided for the segment function to be different.

FIG. 3 illustrates an embodiment of the method for verifying the authenticity of a cartridge.

On introduction of a new cartridge (PRODUCT), the printer (HOST) detects it and sends an activation control signal to the cartridge (ACT). The control signal contains an identifier of a segment 231 (SEGi) to be decoded as well as the corresponding deciphering key (KEYi). According to the mode of ciphering of the used exchanges, part of the key may be contained in the cartridge, or a key for ciphering the exchanges is contained in the cartridge and is used for the transfer of deciphering key KEYi of the segment.

The cartridge (its microprocessor) uses the key transmitted by the printer to decipher the identified segment. Then, the codes of this segment are stored in non-ciphered fashion (STORE UNCIPHERED OPCODES) in a memory (25, FIG. 2) or in an area of memory 23, accessible by processor 26 (PROC) of circuit 22, so that function FCTi contained in the deciphered segment can be executed (EXEC FCTi).

Once the function has been executed by the microprocessor, one or several results (RESULT) are sent by the cartridge to the printer to verify the authenticity.

The printer then verifies whether the result is in accordance with what it expects and determines whether the cartridge is authentic or not (OK/NOK). The procedure in the case of a non-authentic cartridge is usual (printer blocking, error message, etc.).

Figure 4:
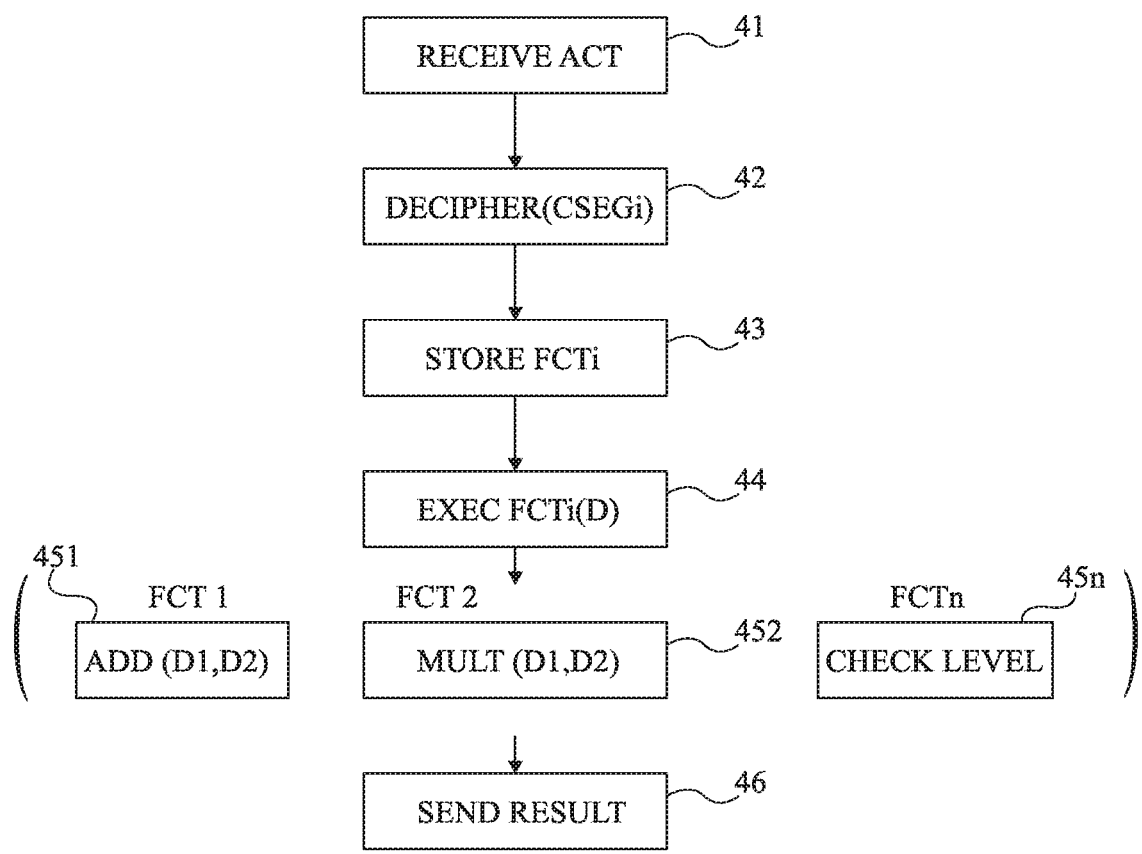
FIG. 4 illustrates, in the form of blocks, an example of steps implemented by a product.

FIG. 4 illustrates, in the form of blocks, an example of steps implemented by a cartridge during the authentication process.

The cartridge starts by receiving (block 41, RECEIVE ACT) an activation control signal sent by the printer.

As indicated hereabove, the electronic circuit of the cartridge deciphers (block 42, DECIPHER(CSEGi)) the memory segment corresponding to the identifier sent by the printer. This identifier is, for example, the beginning address of the segment in memory 23 or the address range of the segment in this memory. As a variation, the cartridge contains a look-up table linking the identifiers (for example, numbers) of the segments to their addresses in memory 23.

Function FCTi contained in the segment is, once deciphered, stored in non-ciphered fashion (block 43, STORE FCTi), for example, in memory 25. Memory 25 is not necessarily a non-volatile memory. It may indeed be provided for the function not to be a permanent function added for the new printer version, but only a function used to verify the authenticity on installing of the cartridge or on each initialization (starting or leaving of the printer stand-by mode). In this case, it is not necessary to store the function in a non-volatile memory, the printer sending an activation control signal causing the deciphering of segment CSEGi every time. An advantage of only storing FCTi in a volatile memory is that this further complicate the pirate's task.

Once the function has been deciphered, it is executed (block 44, EXEC FCTi(D)) by the cartridge circuit. According to the nature of the function, said function uses or not an operand D provided by the printer. The nature of the function may be purely for control purposes (arithmetic operation, for example) or to exploit information of the cartridge or of the printer. FIG. 4 illustrates three arbitrary examples of functions having their respective results expected by printers sending the corresponding activation control signals: a first function FCT1 sum up two data D1 and D2 (block 451, ADD(D1, D2)), data D1 and D2 being for example, for one of them, contained in the activation control signal and, for the other, contained in segment CSEG1; a second function FCT2 multiplies two data D1 and D2 (block 452, MULT (D1, D2)); an n-th function FCTn checks the cartridge ink level (block 45n, CHECK LEVEL). The cartridge sends the result of the function to the printer (block 46, SEND RESULT), which validates or invalidates this result and allows or not the operation. Whatever the function, the printer knows either the result of an operation that it expects, or the nature of the information to be communicated thereto by the cartridge.

According to a first aspect, the activation control signal is sent each time an authentication is needed. It can be considered that the activation control signal includes the execution control signal. The segment is then deciphered each time it should be used. In this case, a storage in a non-volatile memory of the deciphered segment is not necessary since the corresponding function is only used once on each deciphering.

According to a second aspect, the function is, in a first phase, deciphered at the cartridge installation (once per product) and is then stored in non-ciphered fashion in the non-volatile memory of the cartridge. The printer may, in a second phase, implement an authentication procedure, for example, on each leaving of the stand-by mode or on each printing, by sending a control signal for executing the function (possibly, with different arguments from one time to the other).

According to an alternative embodiment, the segments also contain a key capable of being used by the cartridge to then cipher its exchanges with the printer. Such a ciphering is usual per se.

On design of a cartridge type, the printer manufacturer selects a number n of functions FCT to be integrated in ciphered fashion in the cartridge memory. The higher this number, the more it then has the possibility of blocking successive versions of non-authentic cartridges, but the more space this takes in the non-volatile memory of the cartridge. Indeed, the cartridge contains all the ciphered segments as soon as it is created.

Then, for each printer version compatible with this type of cartridge, the manufacturer has the choice of the function to be activated. Preferably, a given printer only has in memory a control signal for activating a given segment CSEGi. As a variation, the identifier of the new segment may be communicated thereto during a software update.

If the printer manufacturer desires, for a new printer version, to revoke a key used by cartridges currently in circulation, the parameters this new printer version so that it activates a new segment on the cartridges. All authentic cartridges will keep on operating and being compatible with the new version.

However, even if a manufacturer of non-authentic cartridges succeeds in reproducing the key of one of the segments on his own cartridges from a piracy of cartridges in circulation, this will only enable the copies to operate on printers of the version using the corresponding function. Copies will not function on the new printer version, which uses another segment. Thus, non-authentic cartridges, adapted to the first series, will only be adapted to the first printer version. This considerably complicates the task of the pirate manufacturer.

Thus, a manufacturer which finds out the existence of copies may parameterize the new printers so that they activate a different segment of cartridges in circulation. The new printer versions, while being compatible with the same type of cartridges, will wait for a different result of the authentication procedure. Accordingly, already-manufactured non-authentic cartridges will not work with new printers.

Further, the provided mechanism is compatible with an optional update of printers already in circulation, for example, during software modifications. Thus, for printers capable of being updated, for example, from an internet connection via a computer or directly, the manufacturer can cause the segment change.

Assuming that the memory of the authentication circuit of a cartridge is totally pirated, all the ciphered segments are then present in non-authentic circuits. The segments may even be decoded since the key received by the printer will be usable by the copy. However, chances are slight for the program, once decoded, to operate and execute the function having its result expected by the printer. Indeed, non-authentic circuits reproduce the mechanisms of protected exchange with the printer by pirating the encryption algorithms and the keys. However, they do not use the same processor cores as the original products. Accordingly, the deciphered functions will be impossible to execute on the processor of the non-authentic circuit.

Exchanges between the printer and the cartridge may be secured in usual fashion (for example, a symmetrical or asymmetrical ciphering based on keys contained in the cartridge and in the printer, provided for these keys to be different in the ciphering keys of segments 231). However, even with the deciphering key of a segment, a non-authentic cartridge will not operate, unless it has exactly the same microcontroller and exploitation system, which strongly limits risks.

Various embodiments have been described, various alterations and modifications will occur to those skilled in the art. In particular, the selection of the number of segments to be stored in the products (accessories or consumables) depends on the application and on the security level desired in terms of possible depth of change. Further, the selection of the authentication mechanisms also depends on the application. Further, the practical implementation of the described embodiments is within the abilities of those skilled in the art based on the functional indications given hereabove and by using encryption and programming tools usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
storing, at a plurality of memory segment locations in a product that must be authenticated for use by a host device, said host device being implementable in a plurality of device versions, a corresponding plurality of enciphered executable functions;
receiving from the host device a first signal which includes an identifier that identifies a selected segment location of the plurality of memory segment locations, wherein the identifier of the selected segment location is assigned to a particular device version of the plurality of device versions of the host device;
accessing the selected segment location to retrieve the particular enciphered executable function of the corresponding plurality of enciphered executable functions that is stored at the selected segment location;
deciphering the particular enciphered executable function;
storing the particular deciphered executable function;
receiving from the host device a second signal requesting product execution of the particular deciphered executable function;
executing by the product of the particular deciphered executable function to generate a result; and
returning the result to the host device as proof that the product is authenticated for use with the particular device version of the host device.

2. The method of claim 1, wherein returning the result comprises enciphering the result for transmission to the host.

3. The method of claim 2, wherein storing the corresponding plurality of enciphered executable functions further comprises storing, at the plurality of memory segment locations in the product, a corresponding key to be used for enciphering the result.

4. The method of claim 1, wherein the first signal further includes a key for deciphering the particular enciphered executable function.

5. The method of claim 1, wherein the first signal is received from the host device only one time by the product.

6. The method of claim 5, wherein storing the particular deciphered executable function comprises storing the particular deciphered executable function in a non-volatile memory.

7. The method of claim 1, wherein the second signal is received from the host device each time the host device operates to use the product.

8. The method of claim 1, wherein the host device is a printer and the product is an ink cartridge.

9. The method of claim 1, further comprising selecting by the host device of the identifier of the selected segment location based on the particular device version of the plurality of device versions for that host device.

10. The method of claim 9, further comprising changing of the identifier of the selected segment location to be selected by the host device based on the particular device version in response to a detection of non-authentic products using the particular enciphered executable function.

11. The method of claim 10, wherein changing comprises software updating of host device having the particular device version with the changed identifier.

12. The method of claim 1, wherein each enciphered executable function of said plurality of enciphered executable functions is configured, when deciphered and executed, to perform a different function.

13. The method of claim 12, wherein at least one enciphered executable function of said plurality of enciphered executable functions, when deciphered and executed, sums a first data with a second data.

14. The method of claim 13, wherein the first signal further includes said first data and said second data is stored at the selected segment location.

15. The method of claim 12, wherein at least one enciphered executable function of said plurality of enciphered executable functions, when deciphered and executed, multiplies a first data with a second data.

16. The method of claim 15, wherein the first signal further includes said first data and said second data is stored at the selected segment location.

17. The method of claim 12, wherein at least one enciphered executable function of said plurality of enciphered executable functions, when deciphered and executed, checks an operational parameter of the product.

18. The method of claim 17, wherein the host device is a printer and the product is an ink cartridge and wherein the operational parameter is ink level.

19. The method of claim 1, further comprising validating by the host device of the returned result so as to authenticate the product for use with the host device.

* * * * *